(12) United States Patent
Donato et al.

(10) Patent No.: US 10,095,783 B2
(45) Date of Patent: Oct. 9, 2018

(54) MULTIPLE ROUNDS OF RESULTS SUMMARIZATION FOR IMPROVED LATENCY AND RELEVANCE

(71) Applicant: Microsoft Technology Licensing, LLC, Redmond, WA (US)

(72) Inventors: Gianluca Donato, Los Altos, CA (US); Ara Avanesyan, San Jose, CA (US); Aparna Rajaraman, Sunnyvale, CA (US)

( * ) Notice: Subject to any disclaimer, the term of this patent is extended or adjusted under 35 U.S.C. 154(b) by 550 days.

(21) Appl. No.: 14/720,964

(22) Filed: May 25, 2015

(65) Prior Publication Data

US 2016/0350412 A1    Dec. 1, 2016

(51) Int. Cl.
*G06F 17/30*    (2006.01)
*G06F 17/24*    (2006.01)

(52) U.S. Cl.
CPC ...... *G06F 17/30719* (2013.01); *G06F 17/243* (2013.01); *G06F 17/30654* (2013.01); *G06F 17/30905* (2013.01)

(58) Field of Classification Search
None
See application file for complete search history.

(56) References Cited

U.S. PATENT DOCUMENTS

| | | | |
|---|---|---|---|
| 5,924,108 A | 7/1999 | Fein et al. | |
| 6,275,820 B1 | 8/2001 | Navin-Chandra et al. | |
| 7,512,601 B2 * | 3/2009 | Cucerzan | G06F 17/30696 |
| 7,587,387 B2 | 9/2009 | Hogue | |
| 7,617,176 B2 | 11/2009 | Zeng et al. | |
| 7,712,028 B2 | 5/2010 | Kuruoglu et al. | |
| 7,853,587 B2 * | 12/2010 | Groeneveld | G06F 17/30719 |
| | | | 707/723 |
| 7,912,849 B2 | 3/2011 | Ohrn et al. | |
| 7,925,496 B1 | 4/2011 | Rubin | |

(Continued)

OTHER PUBLICATIONS

Kopetzky T et al: Visual preview for link traversal on the World Wide Web:, Computer Networks, Elsevier Science Publishers B.V., Amsterdam, NL, vol. 31, No. 11-16, May 17, 1999 (May 17, 1999), pp. 1525-1532, XP004304571, ISSN: 1389-1286, DOI: 10.1016/S1389-1286(99)00050-X the whole document.

(Continued)

*Primary Examiner* — Debbie Le
(74) *Attorney, Agent, or Firm* — Jeffrey L. Ranck; Ranck IP Law (57) ABSTRACT

Architecture that splits the generation of results summaries into at least two phases for reduced latency and improved relevance. A first phase generates a summary quickly and thereby enables subsequent modules to begin processing. A second round then executes in parallel to these other modules to offset the latency. The second round can also provide additional contextual information to the summarization module to improve the quality (relevance) of the summaries. Ultimately, the summaries generated in the two phases are merged. The multiple rounds of summarization enable the first round to be cheaper in processing resources to save overall latency, whereas the second phase can be more expensive, since the second phase can be run in parallel with other modules. Additionally, contextual information can be used to build the full content summaries in the second round.

20 Claims, 7 Drawing Sheets

(56) References Cited

U.S. PATENT DOCUMENTS

| | | | | |
|---|---|---|---|---|
| 8,244,721 | B2* | 8/2012 | Morris | G06F 17/30967 |
| | | | | 707/723 |
| 8,285,699 | B2 | 10/2012 | Groeneveld et al. | |
| 8,655,866 | B1 | 2/2014 | Provine et al. | |
| RE44,794 | E* | 3/2014 | Stephens, Jr. | G06F 17/30696 |
| | | | | 707/722 |
| 8,972,434 | B2* | 3/2015 | English | G06Q 30/0603 |
| | | | | 707/706 |
| 9,576,007 | B1* | 2/2017 | Sivathanu | G06F 17/30321 |
| 9,836,501 | B2* | 12/2017 | Robichaud | G06F 17/30392 |
| 2006/0200464 | A1 | 9/2006 | Gideoni et al. | |
| 2007/0067305 | A1* | 3/2007 | Ives | G06F 17/30864 |
| 2009/0083026 | A1* | 3/2009 | Morsy | G06F 17/30719 |
| | | | | 704/9 |
| 2010/0125581 | A1 | 5/2010 | Peleg et al. | |
| 2010/0185628 | A1 | 7/2010 | Weda et al. | |
| 2010/0287162 | A1 | 11/2010 | Shirwadkar | |
| 2010/0332498 | A1 | 12/2010 | Svore et al. | |
| 2011/0282651 | A1 | 11/2011 | Nygaard et al. | |
| 2012/0197630 | A1 | 8/2012 | Lyons et al. | |
| 2014/0136517 | A1* | 5/2014 | Li | G06F 17/30719 |
| | | | | 707/722 |
| 2014/0149423 | A1 | 5/2014 | Sorkin et al. | |
| 2014/0289260 | A1 | 9/2014 | Simske et al. | |
| 2015/0026146 | A1* | 1/2015 | Mance | G06F 17/30991 |
| | | | | 707/706 |
| 2015/0339392 | A1* | 11/2015 | Reineck | G06F 17/30867 |
| | | | | 707/710 |
| 2015/0379012 | A1* | 12/2015 | Awadallah | G06F 17/30867 |
| | | | | 707/706 |
| 2016/0224676 | A1* | 8/2016 | Miller | G06F 17/30365 |
| 2017/0371979 | A1* | 12/2017 | Murphey | G06F 17/30967 |

OTHER PUBLICATIONS

Anonymous: New Google feature provides previews of Web search results—Tech Addicts:, , Nov. 11, 2010 (Nov. 11, 2010), pp. 1-1, XP055115330, Retrieved from the Internet: URL:http://blogs.inquirer.net/techaddicts/2010/11/11/new-google-feature-provides-previews-of-web-search-results/ [retrieved on Feb. 7, 2017] the whole document.

European Patent Office, Officer Michael May, PCT Written Opinion for Application No. PCT/US2016/033388, May 10, 2017, 9 pages, Germany.

Notification of Transmittal of the International Preliminary Report on Patentability dated Aug. 8, 2017 regarding International Application No. PCT/US2016/033388. 21 pages.

"International Search Report and Written Opinion Issued in PCT Application No. PCT/US2016/033388", dated Aug. 9, 2016, 14 Pages.

"New Google Feature Provides Previews of Web Search Results—Tech Addicts", Retrieved From <<http://web.archive.org/web/20110124002812/http://blogs.inquirer.net/techaddicts/2010/11/11/new-google-feature-provides-previews-of-web-search-results/>>, Nov. 11, 2010, 3 Pages.

Kopetzky, et al., "Visual Preview for Link Traversal on the World Wide Web", In Journal Computer Networks: The International Journal of Computer and Telecommunications Networking, vol. 31, Issue 11-16, May 17, 1999, pp. 1525-1532.

Omara, et al.,"Analysing Anchor Links to Enhance the Web Snippet Clustering Technique", In Proceedings of the 8th International Conference on Informatics and Systems, May 14, 2012, pp. 5.

Leskovec, et al., "Learning Sub-structures of Document Semantic Graphs for Document Summarization", In Proceedings of the KDD Workshop on Link Analysis and Group Detection LinkKDD, Aug. 2004, pp. 9.

Geraci, et al., "Cluster Generation and Cluster Labelling for Web Snippets", In Proceedings of the 13th international conference on String Processing and Information Retrieval, Oct. 11, 2006, pp. 25-36.

International Search Report from the ISA dated Aug. 9, 2016 for International App;lication No. PCT/US2015/033388. 15 pages.

* cited by examiner

MULTIPLE ROUNDS OF RESULTS SUMMARIZATION FOR IMPROVED LATENCY AND RELEVANCE

BACKGROUND

A fundamental stage in a search engine is to generate summaries for the results that are determined to be a good match for the user query. However, in existing systems summarization cannot begin until all results have been retrieved. Other modules might then use the content of the summaries for other tasks (e.g., extracting the main entity for the query). Accordingly, because of these interdependencies, all these operations happen sequentially, and thus, directly and negatively affect the overall time to serve the response to the user.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture splits the generation of results summaries into at least two summarization phases. A first summarization phase generates a summary quickly and thereby enables subsequent modules to begin processing. A second summarization phase then executes in parallel to these other modules to offset the latency. This second summarization phase can also provide additional contextual information to the summarization module to improve the quality (relevance) of the summaries. Ultimately, the summaries generated in the two summarization phases are merged.

The multiple rounds of summarization enables the first summarization phase to be cheaper in processing resources to save overall latency, whereas the second summarization phase can be more expensive (e.g., in resources and time), since the second summarization phase can be run in parallel with other modules. Additionally, contextual information can be used to build the full content summaries in the second summarization phase. Although the first summarization phase may be cheaper (less expensive) in resource utilization and time to completion, the preliminary summaries generated therefrom can comprise less content than the content of the second summarization phase or an equal amount of content as the content of the second summarization phase.

When the summaries for all results (preliminary (first) and second) are available, a new request can be issued: this can be the same as the first request with the flag indicating the second round of summarization, but the request can also contain additional data extracted from the entire set of summaries. The additional data can be the combined set of words of all the other summaries, a subset of the words, or only terms from titles, etc. Before the results (and results summaries) are returned (e.g., to the user), a module merges (e.g., replaces, combines both sets, chooses one set over another set, etc.) the summaries from the two rounds to pick the best (or top) summary.

In one implementation, a system is provided, comprising: a summarization phase component configured to implement multiple summarization phases of results, the multiple summarization phases comprise a first summarization phase and a second summarization phase, the second summarization phase commenced relative to initiation of the first summarization phase; and a summarization component configured to process the multiple summarization phases of the results to generate preliminary (first) results summaries for the first summarization phase and second results summaries for the second summarization phase. The system can also comprise a merge component configured to merge the preliminary results summaries and the second results summaries into merged results summaries, and a selection component configured to select a top result summary from the merged results summaries.

The disclosed architecture can be implemented as an alternative system, comprising: means for generating multiple summarization phases of search results, comprising a preliminary summarization phase and a second summarization phase, the second summarization phase commenced relative to initiation of the preliminary summarization phase; and, means for processing the preliminary summarization phase to generate preliminary results summaries with less content than second results summaries generated by the second summarization phase, the preliminary results summaries obtained prior to or concurrently with the second summarization phase to reduce latency in return of results summaries.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture splits the generation of results (also referred to as documents) summaries into at least two summarization phases. A first phase generates a summary quickly and thereby enables subsequent modules to begin processing. A second round then executes in parallel to these other modules to offset the latency. This second round can also provide additional contextual information to the summarization module to improve the quality (relevance) of the summaries. Ultimately, the summaries generated in the two phases are merged. The multiple rounds of summarization enables the first round to be cheaper in processing resources to save overall latency, whereas the second phase can be more expensive, since the second phase can be run in parallel with other modules. Additionally, contextual information can be used to build the full content summaries in the second round.

The first round employs a web ranker to return the top results for a given query, and these results are passed to the summarization module (component) together with the original query. The request will include an additional flag indicating that this is the first round. The summarization module (also referred to as a caption generation module) then changes the algorithms to avoid expensive processing in this first (or preliminary) round and generate a summary more quickly.

When the summaries for all results (preliminary and second) are available, a new request can be issued: this can be the same as the first request with the flag indicating the second round of summarization, but the request can also contain additional data extracted from the entire set of summaries. The additional data can be the combined set of words of all the other summaries, a subset of the words, or only terms from titles, etc. Before the results are returned (e.g., ultimately to the user), a module merges the summaries from the two rounds to pick the best (or top) summary.

The processing of the summarization phases can be commenced concurrently in time (start at the same time), in parallel (performed with some overlap in time—the first phase starts before the second phases starts, but completes before the second phase completes), or sequentially (the first round completes before the second round begins). Intuitively, the summarization processing that provides minimized latency is where the two phases are commenced at the same time.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
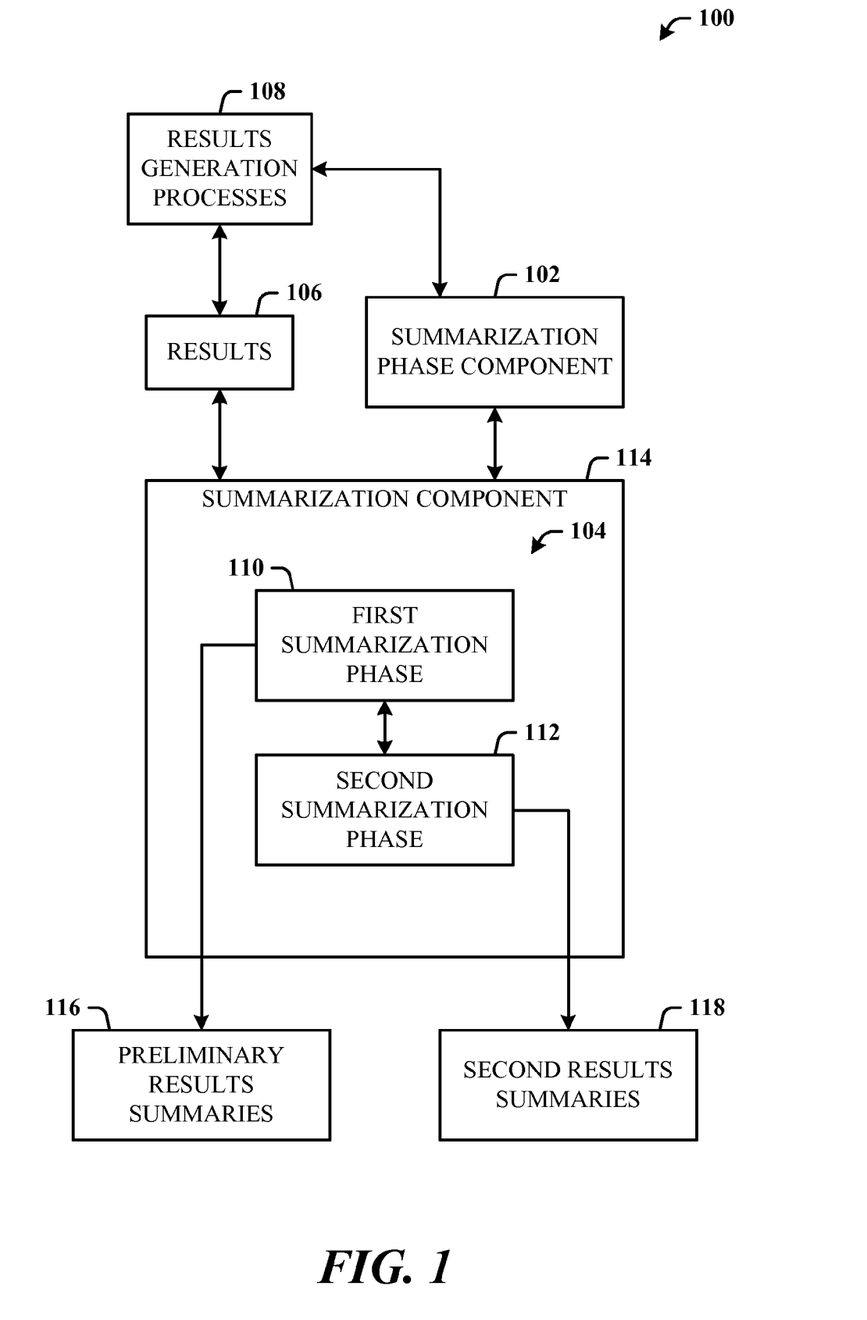
FIG. 1 illustrates a result summarization system in accordance with the disclosed architecture.

FIG. 1 illustrates a result summarization system 100 in accordance with the disclosed architecture. The system 100 can comprise a summarization phase component 102 configured to implement multiple summarization phases 104 of results 106. The summarization phase component 102 can monitor and/or communicate with one or more results generation processes 108 that perform query processing, document (results) retrieval, and ranking, for example. Thus, the results 106 can be an output from the results generation processes 108.

The multiple summarization phases 104 can include a first summarization phase 110 and a second summarization phase 112, and the second summarization phase 112 can be commenced relative to initiation of the first summarization phase 110. The multiple summarization phases 104 can be implemented as part of a summarization component 114 and controlled all or in part by the summarization phase component 102.

The summarization component 114 can be configured to process the multiple summarization phases 104 of the results 106 to generate preliminary results summaries 116 for the first summarization phase 110 and second results summaries 118 for the second summarization phase 112.

The summarization component 114 can be configured to identify the first summarization phase 110 and process the first summarization phase 110 in a way different than processing of the second summarization phase 112. The summarization component 114 employs a first set of algorithms for processing of the first summarization phase 110 and a different set of algorithms for processing of the second summarization phase 112.

The second summarization phase 112 can be commenced to overlap the first summarization phase 110. The second summarization phase 112 can be commenced after completion of the first summarization phase 110, and receives summaries from the first summarization phase 110 for processing in the second summarization phase 112.

Figure 2:
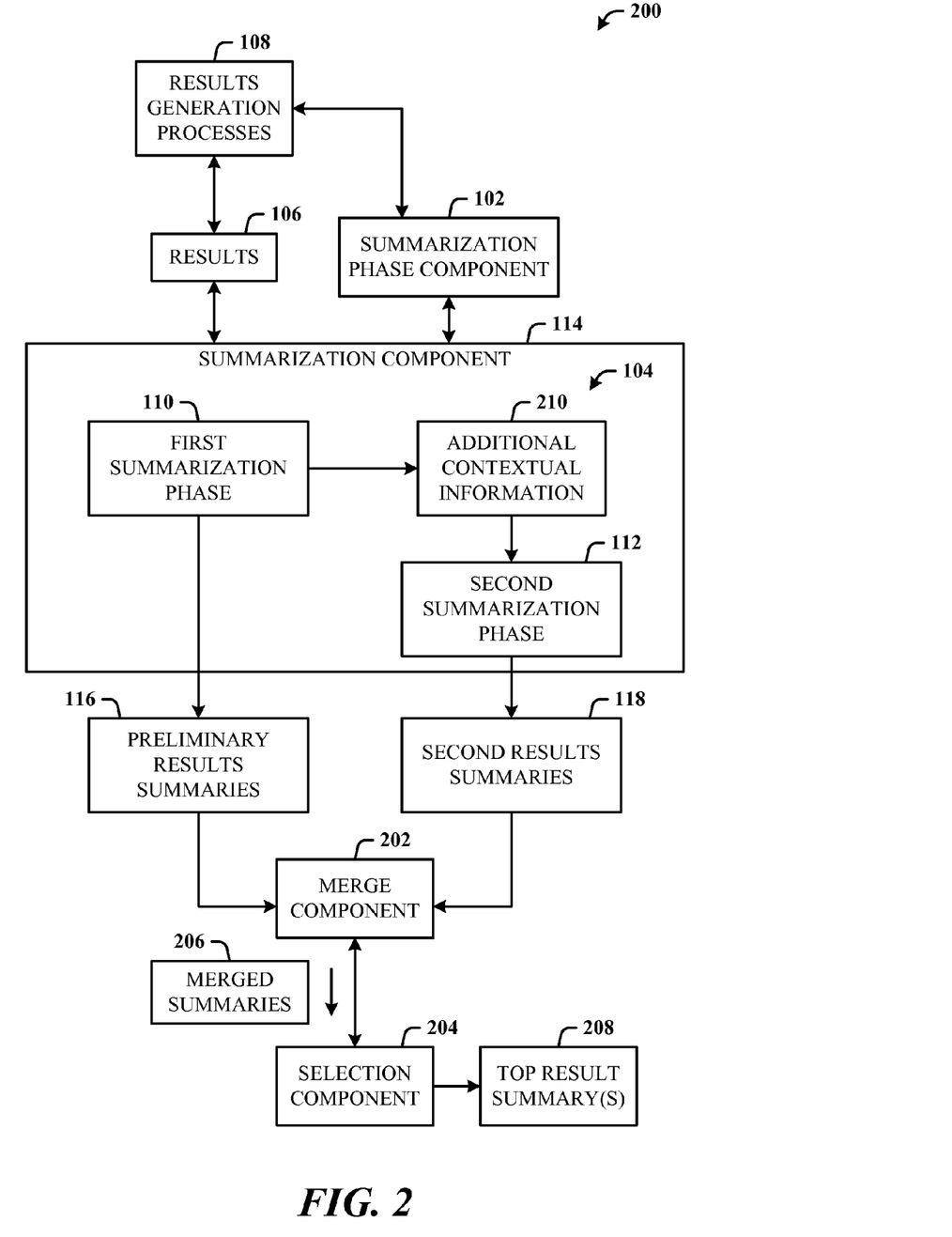
FIG. 2 illustrates an alternative implementation of a results summarization system in accordance with the disclosed architecture.

FIG. 2 illustrates an alternative implementation of a results summarization system 200 in accordance with the disclosed architecture. The system 200 can comprise one or more components of the system 100 of FIG. 1, as well as a merge component 202 and a selection component 204. The merge component 202 can be configured to merge the preliminary results summaries 116 and the second results summaries 118 into merged results summaries 206. The merge operation of the merge component 202 can be configured to replace a summary with another summary, rather than combine the summaries. Alternatively, or in combination therewith, the merge component 202 can be configured to decide smartly which summary version(s) to keep when the summaries are different. The system 200 can further comprise the selection component 204 configured to select a top result summary 208 from the merged results summaries 206. The summarization component 114 can receive additional contextual information 210 to generate the second results summaries 118.

It is to be understood that in the disclosed architecture, certain components may be reoriented, combined, omitted, and additional components may be included. For example, the summarization phase component 102 can be made part of the summarization component 114. Alternatively, the second summarization phase can be executed as a component separate from the summarization component 114. In yet another example, the merge component 202 and/or selection component 204 can be internal to or external from the summarization component 114. Still alternatively, the selection component 204 can be part of the merge component 202.

The disclosed architecture exhibits technical effects associated with improved usability and enhanced reliability. For example, when engaging search, the capability is now provided to serve summaries (e.g., ultimately to the user) much quicker than traditional systems, since the reduced latency round of generating reduced content summaries serves the summaries sooner. Enhanced reliability is realized when additional context information obtained from the first round is then fed into the second round of results summarization. Thus, at least two identical summaries (also referred to as captions) are generated in less time, or more relevant summaries in the same total time, or according to some tradeoff between the previously-mentioned scenarios.

Figure 3:
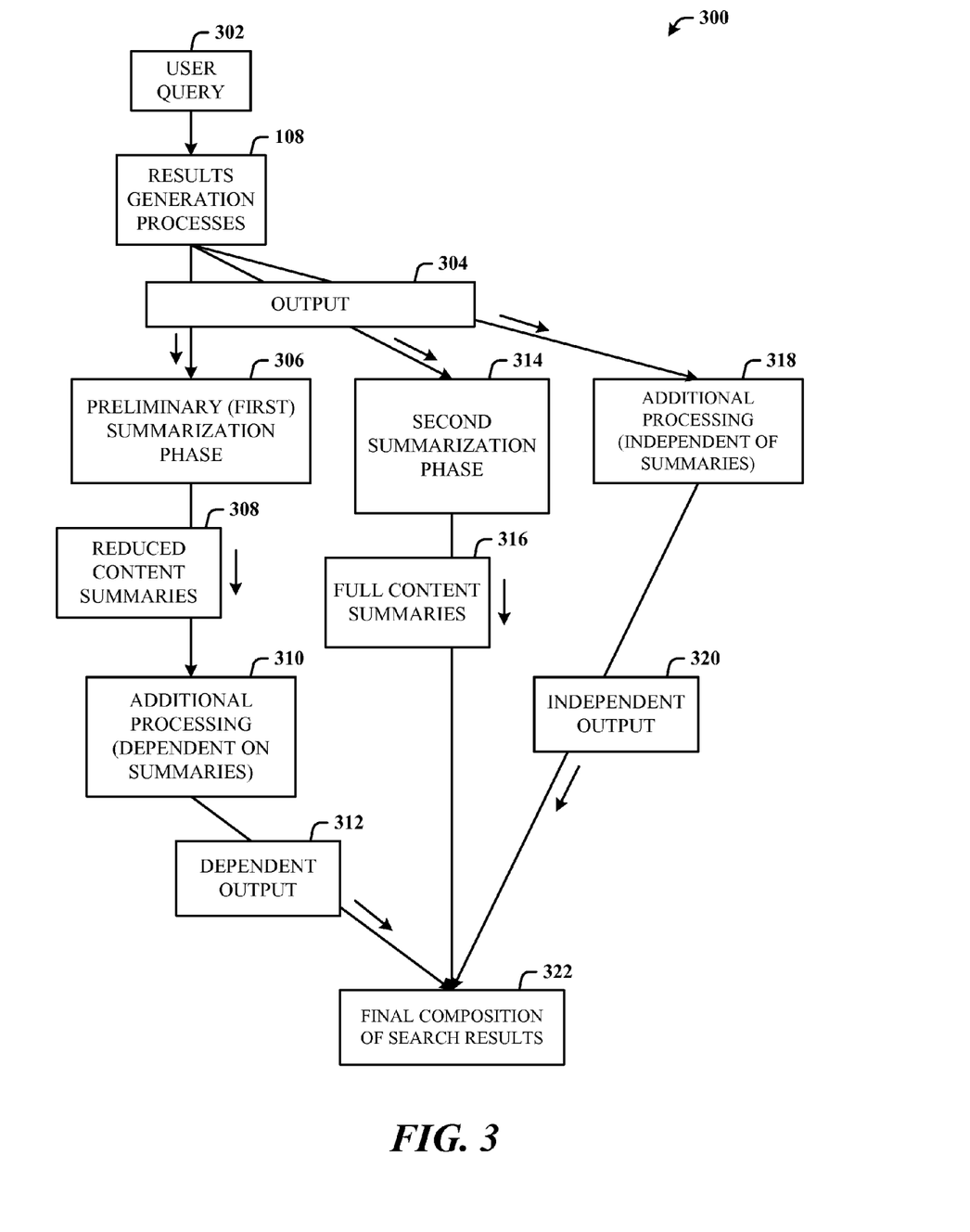
FIG. 3 illustrates a flow diagram of a result summarization system optimized for reduced latency.

FIG. 3 illustrates a flow diagram 300 of a result summarization system optimized for reduced latency. Flow begins where a user query 302 is received by the results generation processes 108. Output 304 of the results generation processes 108 are documents (results) ready for summarization processing. The output 304 is sent to a first (or preliminary) summarization phase 306 (a "first round") for generation of reduced content summaries 308. The first (or preliminary) summarization phase 306 consumes less time to process the output 304 into reduced content summaries 308. The reduced content summaries 308 are then sent for additional dependent processing 310, where the additional dependent processing 310 is dependent on the reduced content summaries 308. The additional dependent processing 310 outputs dependent output 312.

The output 304 can also be sent to a second summarization phase 314 (a "second round") for the generation of full content summaries 316. The second summarization phase 314 consumes more processing time than the first summarization phase 306 in order to output the full content summaries 316. The output 304 can also be sent to additional independent processing 318, where the additional independent processing 318 is independent of the summaries. The additional independent processing 318 outputs independent output 320.

Ultimately, the three outputs of the dependent output 312, full content summaries 316, and independent output 320 are processed at a final composition stage 322 of search results. The final composition 322 can be described as comprising function(s) of either or both of the merge component 202 or/and selection component 204 of FIG. 2, and top result summary(s) 208, and enables the reduced content summaries 308 to be replaced by, merged, or ignored in favor of the full content summaries.

In this diagram 300 for reduced latency, the dependent output 312 can be processed at the final composition stage 322 before the full content summaries 316 are generated by the second summarization phase 314. This enables the reduced content summaries 308 and results to potentially be presented to the user faster than in existing systems.

Figure 4:
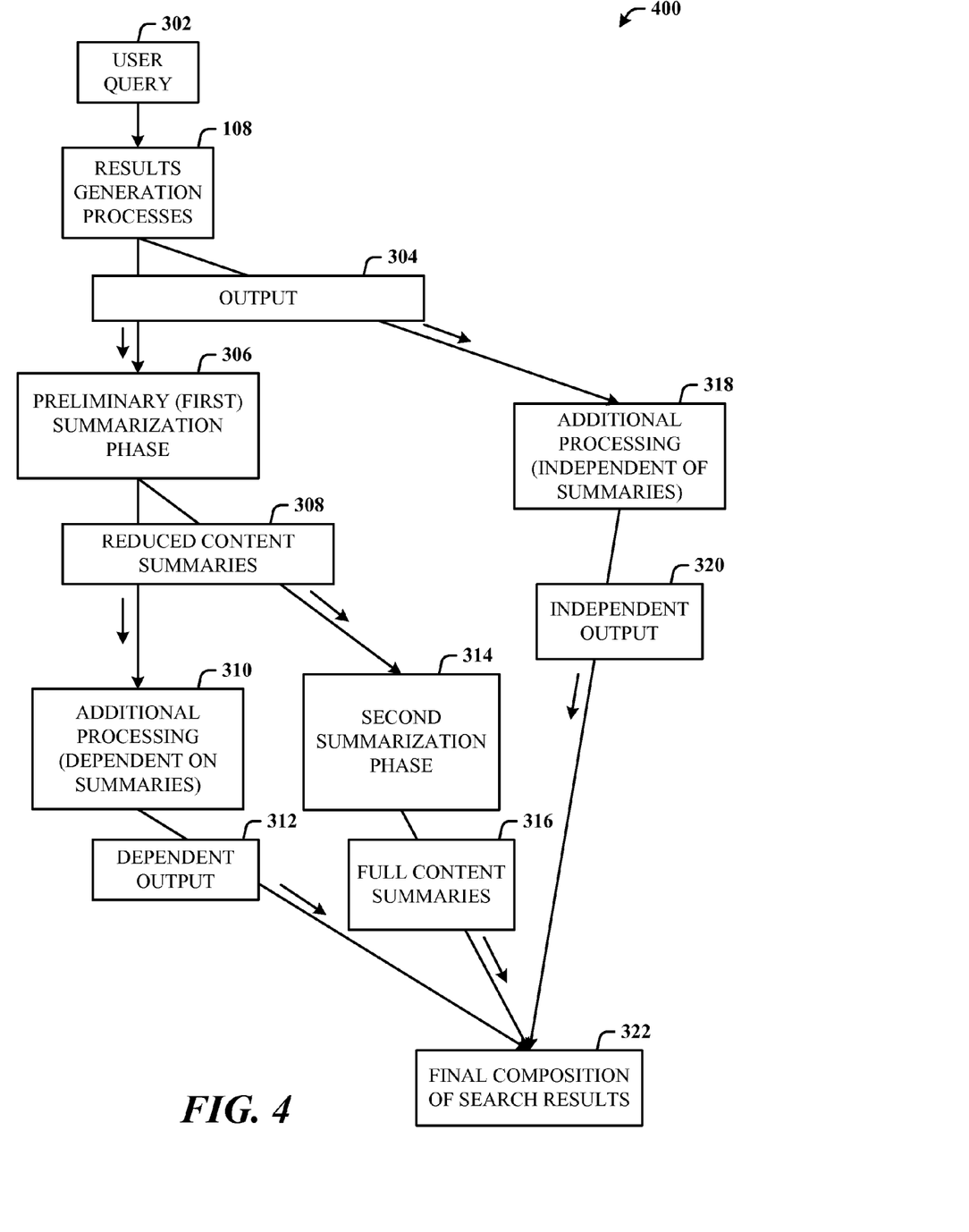
FIG. 4 illustrates a flow diagram of a result summarization system optimized for reduced latency and improved quality (relevance) of the summaries.

FIG. 4 illustrates a flow diagram 400 of a result summarization system optimized for reduced latency and improved quality (relevance) of the summaries. Flow begins where the user query 302 is received by the results generation processes 108. Output 304 of the results generation processes 108 are documents (results) ready for summarization processing. The output 304 is sent to the first (or preliminary) summarization phase 306 for generation of the reduced content summaries 308. The first (or preliminary) summarization phase 306 consumes less time to process the output 304 into reduced content summaries 308. The reduced content summaries 308 are then sent for additional dependent processing 310, where the additional dependent processing 310 is dependent on the reduced content summaries 308. The additional dependent processing 310 outputs the dependent output 312 to the final composition stage 322 of search results.

In support of providing reduced latency, and now improved summary quality, the reduced content summaries 308 can also be input to the second summarization phase 314 for the generation of the full content summaries 316.

The output 304 can also be sent to additional independent processing 318, where the additional independent processing 318 is processing that occurs independent of the summaries. The additional independent processing 318 outputs independent output 320.

Ultimately, the three outputs of the dependent output 312, full content summaries 316, and independent output 320 are processed at final composition stage 322 of search results. In this diagram 300 for reduced latency and improved relevance summaries, the dependent output 312 can be processed at the final composition stage 322 before the full content summaries 316 are generated by the second summarization phase 314. As before, the final composition 322 can be described as comprising function(s) of either or both of the merge component 202 or/and selection component 204 of FIG. 2, and top result summary(s) 208, and enables the reduced content summaries 308 to be replaced by, merged, or ignored in favor of the full content summaries.

It can be the case in either the flow 300 of FIG. 3 or the flow 400 of FIG. 4, that the full content summaries 316 can be input to sub-components of the additional dependent processing 310. This can increase the quality of the results of sub-components.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
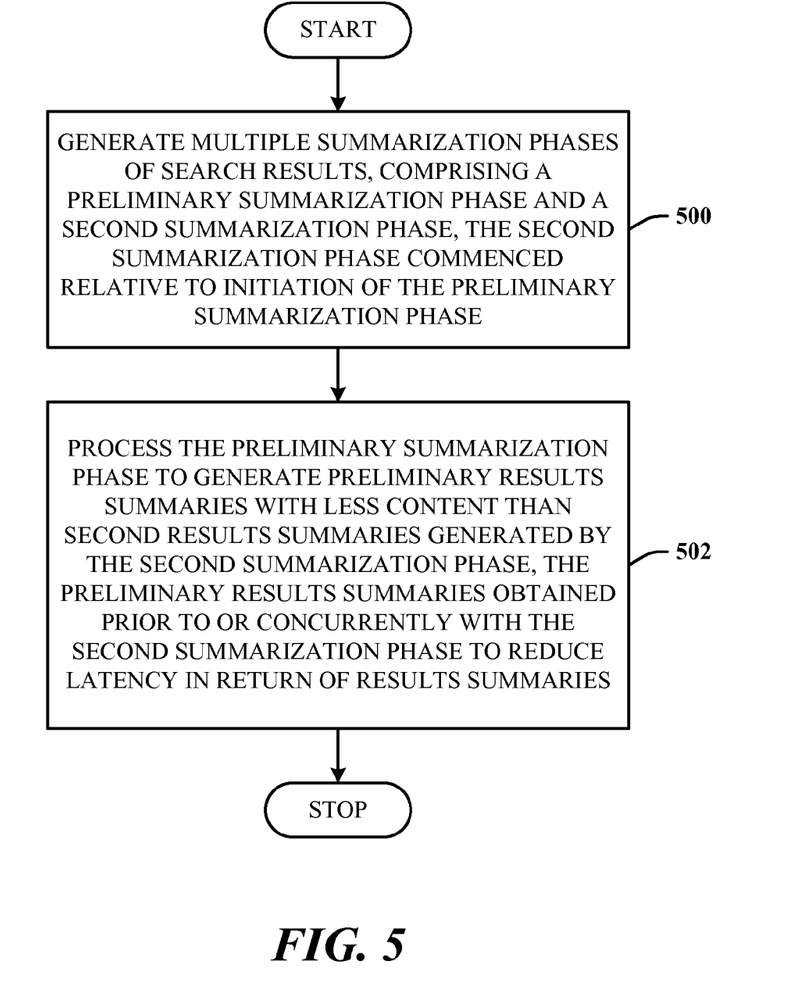
FIG. 5 illustrates a method in accordance with the disclosed architecture.

FIG. 5 illustrates a method in accordance with the disclosed architecture. At 500, multiple summarization phases of search results are generated, comprising a preliminary summarization phase and a second summarization phase. The second summarization phase can be commenced relative to (concurrently with, or sequentially) initiation of the preliminary summarization phase.

At 502, the preliminary summarization phase is processed to generate preliminary results summaries with less content than second results summaries generated by the second summarization phase. The preliminary results summaries can be obtained prior to or concurrently with the second summarization phase to reduce latency in return of results summaries.

The method can further comprise merging the preliminary results summaries and the second results summaries into merged summaries for final summarization processing. The merging process can include replacing the preliminary results summaries with the second results summaries, combining the preliminary results summaries with the second results summaries, or outright ignoring the preliminary results summaries in favor of the second results summaries. The method can further comprise presenting a top set of summaries from the merged summaries, in a results page. The method can further comprise generating the second results summaries using the preliminary results summaries as input to the second summarization phase.

The method can further comprise employing a first set of algorithms to generate the preliminary results summaries from the first summarization phase, and a different set of algorithms to generate full content second results summaries from the second summarization phase. The method can further comprise processing a request that identifies the first summarization phase or the second summarization phase. The method can further comprise automatically switching between the preliminary summarization phase and the second summarization phase based on the request.

Figure 6:
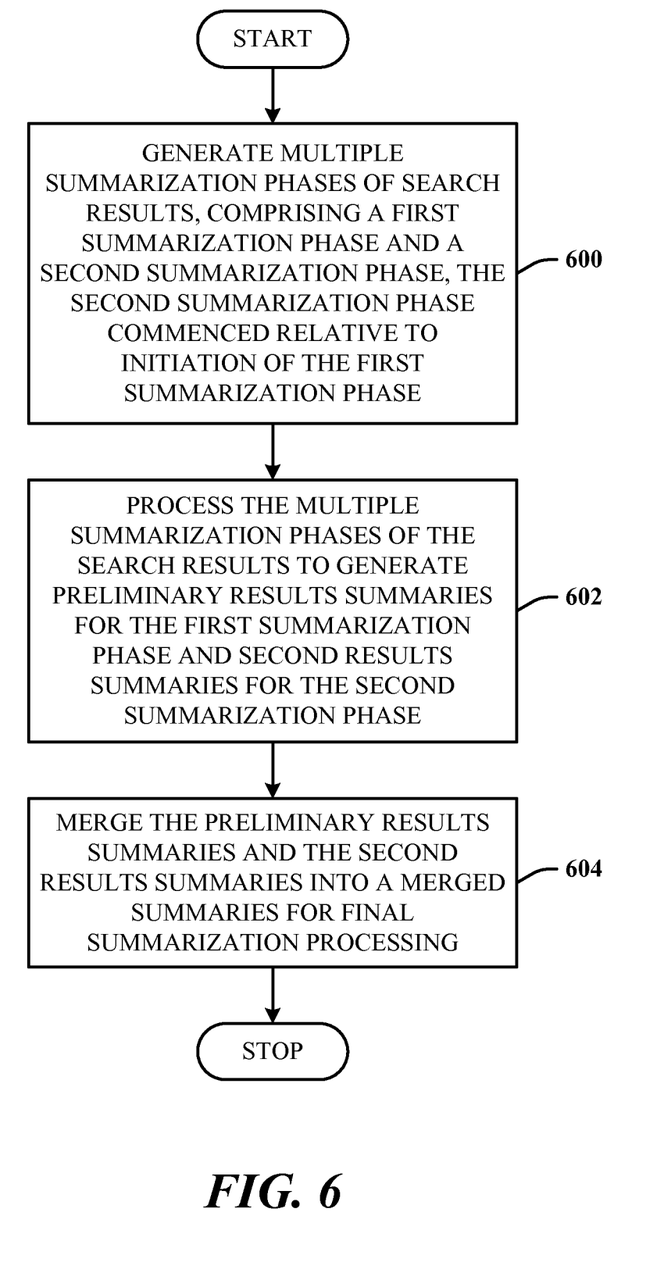
FIG. 6 illustrates an alternative method in accordance with the disclosed architecture.

FIG. 6 illustrates an alternative method in accordance with the disclosed architecture. At 600, multiple summarization phases of search results are generated, comprising a first summarization phase and a second summarization phase. The second summarization phase can be commenced relative to initiation of the first summarization phase. At 602, the multiple summarization phases of the search results are processed to generate preliminary results summaries for the first summarization phase and second results summaries for the second summarization phase. At 604, the preliminary results summaries and the second results summaries are merged into merged summaries for final summarization processing.

The method can further comprise processing the second summarization phase while the first summarization phase is being processed or after the first summarization phase completes. The method can further comprise generating the preliminary results summaries with less content than the second results summaries to reduce latency in succeeding dependent processing of the preliminary results summaries. The method can further comprise generating the second results summaries using the preliminary results summaries as input to the second summarization phase. The method can further comprise presenting a top set of results summaries from the merged summaries in a results page.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
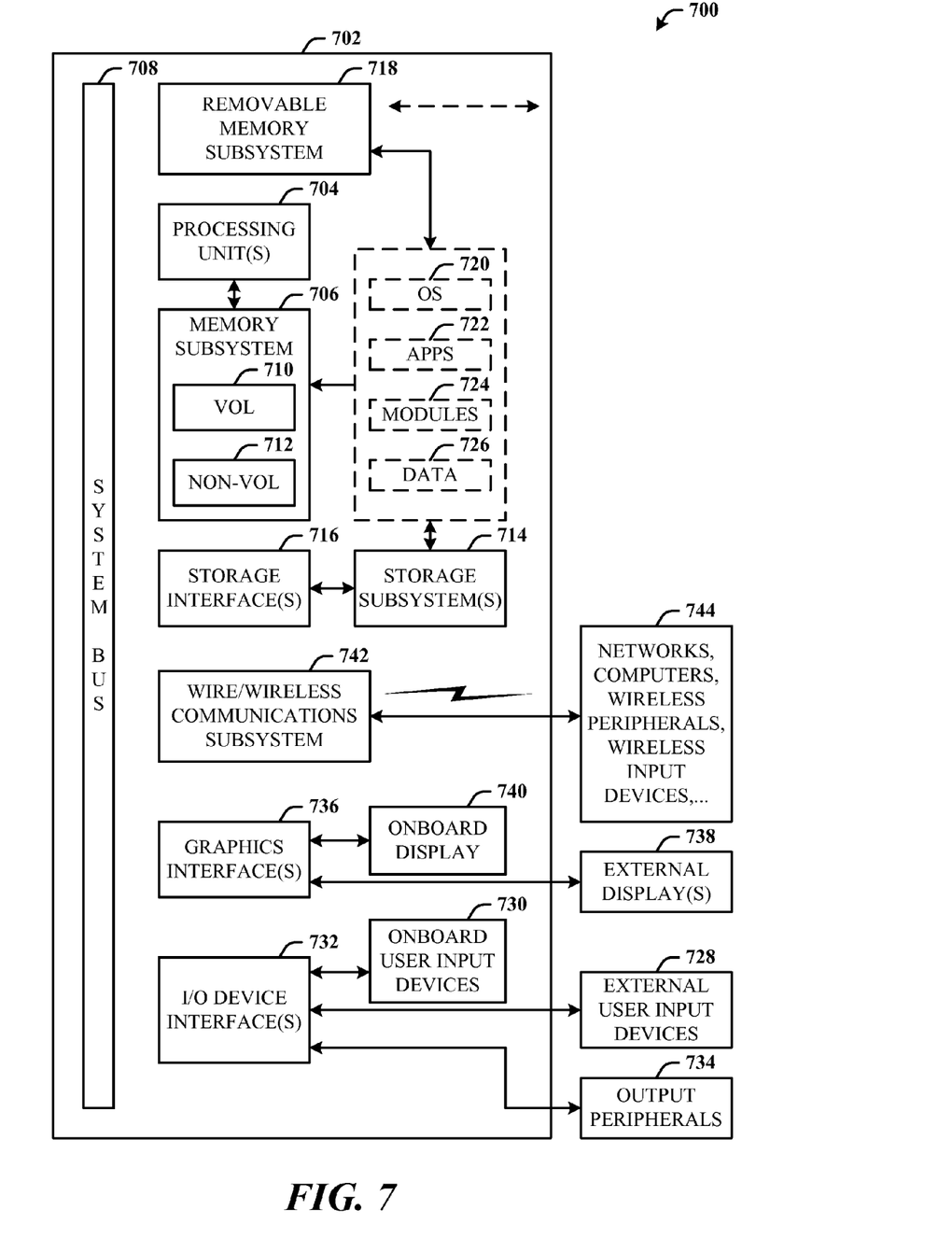
FIG. 7 illustrates a block diagram of a computing system that executes multiple rounds of results summarization for reduced latency and relevance in accordance with the disclosed architecture.

Referring now to FIG. 7, there is illustrated a block diagram of a computing system 700 that executes multiple rounds of results summarization for reduced latency and relevance in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the system 200 of FIG. 2, items and flow of the diagram 300 of FIG. 3, items and flow of the diagram 400 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for generating multiple summarization phases of search results, comprising a preliminary summarization phase and a second summarization phase, the second summarization phase commenced relative to initiation of the preliminary summarization phase; and, means for processing the preliminary summarization phase to generate preliminary results summaries with less content than second results summaries generated by the second summarization phase, the preliminary results summaries obtained prior to or concurrently with the second summarization phase to reduce latency in return of results summaries.

The disclosed architecture can be implemented as an alternative system, comprising: means for generating multiple summarization phases of search results, comprising a first summarization phase and a second summarization phase, the second summarization phase commenced relative to initiation of the first summarization phase; means for processing the multiple summarization phases of the search results to generate preliminary results summaries for the first summarization phase and second results summaries for the second summarization phase; and means for merging the preliminary results summaries and the second results summaries into merged summaries for final summarization processing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a summarization phase component configured to implement multiple summarization phases of search results determined to be relevant to a submitted query, the multiple summarization phases comprise a first summarization phase and a second summarization phase, the second summarization phase commenced relative to initiation of the first summarization phase;
    a summarization component configured to process the multiple summarization phases of the results to generate preliminary results summaries for the first summarization phase and second results summaries for the second summarization phase;
    a merge component to merge the preliminary results summaries for the first summarization phase and the second results summaries for the second summarization phase to create merged summaries prior to returning search results to a user device; and
    at least one hardware processor configured to execute computer-executable instructions in a memory, the instructions executed to enable the summarization phase component and the summarization component.

2. The system of claim 1, further comprising a selection component configured to select a top result summary from the merged summaries.

3. The system of claim 1, wherein the summarization component receives additional contextual information extracted from the preliminary summarization results to generate the second results summaries.

4. The system of claim 1, wherein the summarization component is configured to identify the first summarization phase and process the first summarization phase in a way different than processing of the second summarization phase.

5. The system of claim 4, wherein the summarization component employs a first set of algorithms for processing of the first summarization phase and a different set of algorithms for processing of the second summarization phase.

6. The system of claim 1, wherein the second summarization phase is commenced to overlap the first summarization phase.

7. The system of claim 1, wherein the second summarization phase is commenced after completion of the first summarization phase, and receives summaries from the first summarization phase for processing in the second summarization phase.

8. A method for reducing latency in creating search results or improving the relevance of search results or both, comprising acts of:
    initiating a preliminary summarization phase and initiating a second summarization phase either prior to receiving preliminary results summaries from the preliminary summarization phase or in response to receiving preliminary results summaries from the preliminary summarization phase;
    receiving the preliminary results summaries from the preliminary summarization phase without sending the preliminary results summaries to the client device, the preliminary results summaries comprising summaries of search results from a user query;
    receiving second results summaries from the second summarization phase, the second results summaries comprising summaries of search results from the user query; and
    prior to returning results to the client device, merging the preliminary results summaries and the second results summaries into merged summaries for final summarization processing.

9. The method of claim 8, further comprising presenting a top set of summaries from the merged summaries, in a results page to the client device.

10. The method of claim 8, further comprising generating the second results summaries using the preliminary results summaries as input to the second summarization phase.

11. The method of claim 8, further comprising employing a first set of algorithms to generate the preliminary results summaries from the preliminary summarization phase, and a different set of algorithms to generate full content second results summaries from the second summarization phase.

12. The method of claim 8, further comprising processing a request that identifies the preliminary summarization phase or the second summarization phase.

13. The method of claim 12, further comprising automatically switching between the preliminary summarization phase and the second summarization phase based on the request.

14. The method of claim 8, wherein merging the preliminary results summaries and second results summaries comprises at least one of:

replacing the preliminary results summaries with the second results summaries;

combining the preliminary results summaries with the second results summaries; and deciding to keep one of the preliminary results summaries and the second results summaries and discarding the other.

15. A method that reduces latency in generating search results, comprising acts of:

generating multiple summarization phases of search results, comprising a first summarization phase and a second summarization phase, the second summarization phase commenced relative to initiation of the first summarization phase;

processing the multiple summarization phases of the search results to generate preliminary results summaries for the first summarization phase and second results summaries for the second summarization phase; and prior to returning results to a client device, merging the preliminary results summaries and the second results summaries into merged summaries for final summarization processing.

16. The method of claim 15, further comprising processing the second summarization phase while the first summarization phase is being processed or after the first summarization phase completes.

17. The method of claim 15, further comprising generating the preliminary results summaries with less content than the second results summaries to reduce latency in succeeding dependent processing of the preliminary results summaries.

18. The method of claim 15, further comprising generating the second results summaries using the preliminary results summaries as input to the second summarization phase.

19. The method of claim 15, further comprising presenting a top set of results summaries from the merged summaries in a results page.

20. The method of claim 17, wherein the preliminary results are sent for additional dependent processing that is dependent on the reduced content preliminary results being available.

* * * * *